United States Patent
Shiraishi

(10) Patent No.: US 6,630,972 B1
(45) Date of Patent: Oct. 7, 2003

(54) TRANSMISSION LIQUID CRYSTAL PANEL TO BLOCK RAY OF LIGHT TOWARD THIN FILM TRANSISTORS WITH A LIGHT BLOCKING FILM

(75) Inventor: Yasushi Shiraishi, Tokyo (JP)

(73) Assignee: NEC Corporation, Tokyo (JP)

(*) Notice: Subject to any disclaimer, the term of this patent is extended or adjusted under 35 U.S.C. 154(b) by 286 days.

(21) Appl. No.: 09/671,865

(22) Filed: Sep. 27, 2000

(30) Foreign Application Priority Data

Sep. 30, 1999 (JP) .......................................... 11-279517

(51) Int. Cl.⁷ ............................................. G02F 1/1333
(52) U.S. Cl. .......................................... 349/110; 349/44
(58) Field of Search .......................... 349/110, 47, 44, 349/38, 106

(56) References Cited

U.S. PATENT DOCUMENTS

| | | | | |
|---|---|---|---|---|
| 5,510,916 A | * | 4/1996 | Takahashi | 349/110 |
| 5,691,782 A | * | 11/1997 | Nishikawa et al. | 349/47 |
| 5,708,485 A | * | 1/1998 | Sato et al. | 349/42 |
| 5,760,861 A | * | 6/1998 | Kim | 349/110 |
| 5,894,136 A | * | 4/1999 | Wook | 257/59 |
| 5,903,326 A | * | 5/1999 | Lee et al. | 349/42 |
| 5,920,082 A | * | 7/1999 | Kitazawa et al. | 257/59 |
| 5,923,390 A | * | 7/1999 | Jung Mok et al. | 349/38 |
| 5,966,193 A | * | 10/1999 | Zhang et al. | 349/110 |
| 6,034,749 A | * | 3/2000 | Sato et al. | 349/47 |
| 6,124,904 A | * | 9/2000 | Sato | 349/43 |

FOREIGN PATENT DOCUMENTS

| | | |
|---|---|---|
| JP | 5-45643 | 2/1993 |
| JP | 8-292450 | 11/1996 |
| JP | 9-318935 | 12/1997 |
| JP | 10-206889 | 8/1998 |
| JP | 11-84422 | 3/1999 |
| JP | 11-95687 | 4/1999 |
| KR | 1997-0028689 | 6/1997 |

* cited by examiner

Primary Examiner—Kenneth Parker
Assistant Examiner—David Chung
(74) Attorney, Agent, or Firm—Katten Muchin Zavis Rosenman

(57) ABSTRACT

A transmission liquid crystal panel blocks rays of light incident on a multiplicity of thin film transistors from above not only with an upper metal film of high reflectance but also with at least one of light blocking film of low light transmittance. The light blocking film of low reflectance is laminated below the upper metal film and above the thin film transistors, and a light absorbing film of low reflectance is laminated above a multiplicity of lower light blocking films and below the thin film transistors. Thus, even if rays of light reflected by the lower surface of a transparent substrate is multiple reflected by the lower surface of the upper metal film or the upper surface of the lower light blocking film, stray light generated from the multiple reflections does not reach the thin film transistors. Therefore the stray light is prevented from impairing the operations of the thin film transistors.

19 Claims, 10 Drawing Sheets

TRANSMISSION LIQUID CRYSTAL PANEL TO BLOCK RAY OF LIGHT TOWARD THIN FILM TRANSISTORS WITH A LIGHT BLOCKING FILM

BACKGROUND OF THE INVENTION

1. Field of the Invention

The present invention relates to a transmission liquid crystal panel through which rays of light are transmitted downwardly from above, and more particularly to a transmission liquid crystal panel in which encapsulated liquid crystal is driven by thin film transistors in an active matrix mode.

2. Description of the Related Art

Conventionally, image displays for displaying images on a screen utilizing liquid crystal have been put to practical use as liquid crystal projectors and projection televisions. Such an image display generally includes a light source, a transmission liquid crystal panel and a screen, in which rays of light emitted from the light source is transmitted through the transmission liquid crystal panel and radiated on the screen.

FIG. 1 shows a liquid crystal light valve 100 which is a prior art of the transmission liquid crystal panel. Liquid crystal light valve 100 comprises as its main components, transparent substrate 101, numerous lower light blocking films 102, numerous TFTs (Thin Film Transistor) 103, a plurality of gate electrodes (not shown), a plurality of drain electrodes (not shown), a plurality of data electrodes 104, a plurality of upper metal films 105, planarizied layer 106, numerous separate electrodes 107, encapsulated liquid crystal 108, common electrodes 109, and opposite substrate 110.

For the sake of simplicity, in the following description "lower side, upper side" will designate the circuit side, the liquid crystal side, respectively in the laminating direction of the various types of the layers in liquid crystal light valve 100, as shown in FIG. 1.

Transparent substrate 101 is made of a colorless and transparent insulating glass substrate, on the surface of which, a plurality of lower light blocking films 102 are laminated. Lower light blocking films 102 are made of WSi (tungsten silicide) with high heat resistance and low light transmittance, and are formed in a layer thickness and a pattern so as to shield each of numerous TFTs 103 from stray light in an upwardly slanted direction from below.

TFT 103 is located above lower light blocking film 102 through interlayer insulating film 111, and includes a source region and a drain region formed thereon (not shown). The source region is connected to data electrode 104, while the drain region is connected to the drain electrode (not shown). The gate electrode (not shown) of TFT 103 comprises a metal layer with a pattern extending in a lateral direction in the drawing, and is located generally on the upper surface of TFT 103.

Data electrode 104 comprises an aluminum layer with a pattern extending in a direction normal to the drawing, and laminated above TFT 103 through interlayer insulating film 112. In other words, the gate electrodes and data electrodes 104 form a matrix electrode, at the intersections of which respective TFTs 103 are arranged.

Upper metal film 105 is made of a highly reflective aluminum layer laminated above data electrode 104 through interlayer insulating film 113, and is formed in such a layer thickness and a pattern as to shield data electrode 104. Planarizied layer 106 is made of insulating organic resin such as polyimide and laminated on upper metal film 105 with its upper surface being formed flat.

Each separate electrodes 107 is made of ITO (Indium Tin Oxide) layer formed on the upper surface of planarizied layer 106, and is connected to the drain electrode of TFT 103.

More specifically, as mentioned above, the gate electrodes and data electrodes 104 form the matrix electrode which is separated into numerous rectangular sections aligned in the longitudinal and transverse directions, each section corresponding to each a display pixel in a dot matrix. Each separate electrode 107 is formed for each display pixel and connected to each TFT 103 through a contact hole (not shown).

Opposite substrate 110 is also made of a colorless and transparent insulating glass substrate and is laminated above planarizied layer 106 with a predetermined gap there between through a spacer member (not shown). Common electrodes 109 are also made of an ITO layer, and are uniformly distributed on the lower surface of opposite substrate 110. Encapsulated liquid crystal 108 is made of liquid crystal encapsulated in the gap between planarizied layer 106 and opposite substrate 110, and an electric field is applied to encapsulated liquid crystal 108 with separate electrode 107 and common electrodes 109.

A peripheral circuit (not shown) is formed on the periphery of liquid crystal light valve 100 having the aforementioned laminated structure. The peripheral circuit is connected to TFTs 103 with the gate electrodes and data electrodes 104 in a matrix form. In addition, lower light blocking film 102 is grounded, and upper metal film 105 is also used as the wiring for the peripheral circuit.

Liquid crystal light valve 100 of the above configuration is utilized as part of an image display (not shown) together with a light source and a screen. In such an image display, the screen is laminated in an optical path from the light source through liquid crystal light valve 100, and rays of light emitted from the light source is irradiated on liquid crystal light valve 100 from above.

When the image display inputs image data to the peripheral circuit of liquid crystal light valve 100 at this time, the peripheral circuit outputs driving signals corresponding to the image data to TFTs 103 through the gate electrodes and data electrodes 104. TFTs 103 arranged in a matrix are individually turned with a driving voltage being then applied only to separate electrodes 107 connected to TFTs 103 turned ON.

Thus, the presence or absence of the light transmittance of encapsulated liquid crystal 108 is controlled in accordance with a dot matrix image. Rays of light transmit through liquid crystal light valve 100 from upward to downward and is irradiated on the screen, so that the dot matrix image is displayed on the screen.

In liquid crystal light valve 100 since encapsulated liquid crystal 108 is driven with TFTs 103 in the active matrix mode, the image display using liquid crystal light valve 100 can display a dot matrix image with high definition without causing crosstalk.

In the aforementioned liquid crystal light valve 100, upper metal film 105 since data electrode 104 is shielded by electromagnetic noise, which causes can also be prevented the malfunction of TFT 103, from entering data electrode 104. In addition, upper metal film 105 is also utilized as the wiring of the peripheral circuit, which need not be newly formed.

When rays of light are incident on TFT 103, includes an LDD (Lightly Doped Drain-Source) region (not shown)

made of polysilicon, then leak current is generated to inhibit operational characteristics. Since the rays of light are transmitted through liquid crystal light valve 100 from above to downward, upper metal film 105 also serves to block the rays of light incident on TFT 103 from above.

In liquid crystal light valve 100 in which various types of layers are laminated, the rays of light transmitted from upward to downward may be reflected inside, and become stray light. However, lower light blocking film 102 formed below TFT 103 can prevent stray light reflected by the lower surface of transparent substrate 101 and directed toward a slant and upward direction from being entering directly on TFT 103.

However, since upper metal film 105 serving as the wiring of the peripheral circuit and as a shield for data electrode 104 is made of an aluminum film and fine gaps exist on the boundaries among particles although upper metal film 105 effectively reflects incident ray of light in reality, it is difficult to effectively block the transmission of the rays of light.

For this reason, as shown in FIG. 1, the rays of light may enter TFT 103 after they pass through upper metal film 105, which impairs the operational characteristics of TFT 103. To prevent this, the thickness of upper metal film 105 may be increased. To increase the thickness, however, deteriorates the smoothness of the upper surface of planarizied layer 106 and reduces the aperture ratio of liquid crystal light valve 100.

In addition, since data electrode 104 located above TFT 103 is also made of aluminum, it effectively reflects incident rays of light but they are difficult to effectively block its transmission. Lower light blocking film 102 is made of WSi with high heat resistance and low light transmittance which effectively reflect incident rays of light because is heated at a high temperature in the manufacturing process of TFT 103 located above lower light blocking film 102.

As a result, stray light reflected by the lower surface of transparent substrate 101 and directed toward a slant and upward direction may also enter TFT 103 after multiple reflection by the lower surface of upper metal film 105, the lower surface of data electrode 104 and the upper surface of lower light blocking film 102, impairing the operational characteristics of TFT 103.

SUMMARY OF THE INVENTION

It is an object of the present invention to provide a transmission liquid crystal panel capable of effectively preventing incidence of rays of light on thin film transistors.

It is another object of the present invention to provide an image display for effectively displaying images using the transmission liquid crystal panel according to the present invention.

It is a further object of the present invention to provide a method of manufacturing a transmission liquid crystal panel capable of effectively preventing incidence of rays of light on a thin film transistors.

According to one aspect of the present invention, a transmission liquid crystal panel comprises lower light blocking films, thin film transistors to which data electrodes, gate electrodes and drain electrodes are connected, upper metal films, a planarizied layer, separate electrodes, encapsulated liquid crystal, a common electrode, and an opposite substrate sequentially located above a transparent substrate, through which rays of light are transmitted downwardly from above. A light blocking film with lower light transmittance and lower reflectance than those of the upper metal film is formed above the thin film transistors and below the upper metal film.

In the transmission liquid crystal panel according to the present invention, the presence or absence of the light transmittance in the encapsulated liquid crystal is controlled by the thin film transistors to produce an image from light transmittance in an active matrix mode so that rays of light transmitted from upward to downward are regulated in accordance with the image. The upper metal film located above the thin film transistors limits the rays of light incident on the thin film transistor from above.

Some of the rays of light, however, are transmitted through the upper metal film. The light blocking film located below the upper metal film and above the thin film transistor has low light transmittance and blocks the rays of light transmitted through the upper metal film and directed toward the thin film transistors. In addition, since the light blocking film has low reflectance, it can prevent the ray of light transmitted through the upper metal film from becoming stray light as a result of multiple reflection by the upper surface of the light blocking film and the lower surface of the upper metal film.

A lower light blocking film with high heat resistance and low light transmittance located below the thin film transistors can prevent the rays of light reflected by the lower surface of the transparent substrate or the like from being incident directly on the thin film transistors. However, since the lower light blocking film effectively reflects the rays of light, the rays of light reflected by the lower surface of the transparent substrate or the like may be reflected by the lower surface of the upper metal film and incident on the upper surface of the lower light blocking film to become stray light which reaches the thin film transistors.

The light blocking film with low light transmittance, however, is located below the upper metal film and above the thin film transistors. Thus, the light blocking film blocks the rays of light which is reflected by the lower surface of the transparent substrate or the like and directed toward the lower surface of the upper metal film. Therefore it is possible to prevent the rays of light from becoming stray light as a result of multiple reflections by the lower surface of the upper metal film and the upper surface of the lower light blocking film. In addition, since the light blocking film has low reflectance, it can prevent the rays of light from becoming stray light as a result of multiple reflection by the lower surface of the light blocking film and the upper surface of the lower light blocking film.

For this reason, stray light with high intensity can be prevented from being incident on the thin film transistors, and the thin film transistors can be effectively operated to satisfactorily produce images in the active matrix mode.

According to another aspect of the present invention, the transmission liquid crystal panel includes the light blocking film, with lower reflectance than that of the upper metal film formed above the thin film transistors and below the upper metal film, and the light absorbing film with lower reflectance and higher heat resistance than those of the lower light blocking film formed below the thin film transistors and above the lower light blocking film.

Similarly, in the transmission liquid crystal panel of the present invention, the upper metal film located above the thin film transistors limit rays of light incident on the thin film transistors from above. In addition, the lower light blocking film with high heat resistance and low light transmittance located below the thin film transistors prevents the rays of light reflected by the lower surface of the transparent substrate or the like from being incident directly on the thin film transistors.

However, since the lower light blocking film effectively reflects the rays of light, the rays of light reflected by the lower surface of the transparent substrate or the like may be reflected by the lower surface of the upper metal film and incident on the upper surface of the lower light blocking film to become stray light which reaches the thin film transistors. The light blocking film, however, is located below the upper metal film and above the thin film transistors, as well as the light absorbing film located above the lower light blocking film and below the thin film transistors. Thus, even when the rays of light reflected by the lower surface of the light blocking film and the upper surface of the lower light blocking film is incident on the light absorbing film and the light blocking film, the light absorbing film and the light blocking film with low reflectance attenuate the incident rays of light, thereby making it possible to prevent the occurrence of stray light as a result of multiple reflection.

Therefore, stray light with high intensity can be prevented from being incident on the thin film transistors, and the thin film transistors can be effectively operated to satisfactorily produce images in the active matrix mode.

According to a further aspect of the present invention, the transmission liquid crystal panel includes the light blocking film with lower light transmittance and lower reflectance than those of the upper metal film formed above the thin film transistors and below the upper metal film, and the light absorbing film with lower reflectance and higher heat resistance than those of the lower light blocking film formed below the thin film transistors and above the lower light blocking film.

Similarly, in the transmission liquid crystal panel of the present invention, the upper metal film located above the thin film transistors limits rays of light incident on the thin film transistors from above. While some of the rays of light are transmitted through the upper metal film, the light blocking film is located below the upper metal film and above the thin film transistors.

Since the light blocking film has low light transmittance, it blocks the rays of light transmitted through the upper metal film and directed toward the thin film transistors. In addition, the low reflectance of the light blocking film can prevent the rays of light transmitted through the upper metal film from becoming stray light as a result of multiple reflection by the upper surface of the light blocking film and the lower surface of the upper metal film.

The lower light blocking film with high heat resistance and low light transmittance located below the thin film transistors can prevent the rays of light reflected by the lower surface of the transparent substrate or the like from being incident directly on the thin film transistors. However, since the lower light blocking film effectively reflects the rays of light, the rays of light reflected by the lower surface of the transparent substrate or the like may be reflected by the lower surface of the upper metal film and incident on the upper surface of the lower light blocking film to become stray light which reaches the thin film transistors.

The light blocking film, however, is located below the upper metal film and above the thin film transistors, while the light absorbing film located above the lower light blocking film and below the thin film transistors. Thus, even when the rays of light reflected by the lower surface of the light blocking film and on the upper surface of the lower light blocking film is incident on the light absorbing film and the light-blocking film, the light absorbing film and the light blocking film with low reflectance attenuate the incident rays of light, thereby making it possible to prevent the occurrence of stray light as a result of multiple reflection.

Therefore, stray light with high intensity can be prevented from being incident on the thin film transistors, and the thin film transistors can be effectively operated to satisfactorily produce images in the active matrix mode.

In an embodiment, the light absorbing film in the same pattern as that of the lower light blocking film is directly laminated on the upper surface of the lower light blocking film. In this case, the light absorbing film can reliably prevent reflection of rays of light by the upper surface of the lower light blocking film. In addition, the light absorbing film and the lower light blocking film can be simultaneously patterned in the manufacturing process to allow simple production of the transmission liquid crystal panel.

In an embodiment, the light blocking film in the same pattern as that of the upper metal film is directly laminated on the lower surface of the upper metal film. In this case, the light blocking film can reliably prevent reflection of rays of light by the lower surface of the upper metal film. In addition, the upper metal film and the light blocking film can be simultaneously patterned in the manufacturing process to allow simple production of the transmission liquid crystal panel.

In an embodiment, the light blocking film has conductivity. In this case, the upper metal film and the light blocking film can shield the data electrode to improve the shielding of the data electrode.

According to one aspect of the present invention, an image display comprises a light source, the transmission liquid crystal panel of the present invention, and a screen. In the image display of the present invention, the light source emits rays of light which is transmitted through the transmission liquid crystal panel and radiated on the screen, thereby displaying on the screen a dot matrix image produced by the transmission liquid crystal panel in the active matrix mode. Since the transmission liquid crystal panel of the present invention can effectively produce images in the active matrix mode with satisfactory operations of thin film transistors, the image display of the present invention produces images with good quality displayed on the screen.

According to one aspect of the present invention, a method of manufacturing a panel comprises the steps of, forming a first functional layer with high heat resistance and low light transmittance on the upper surface of the transparent substrate, forming a second functional layer with lower reflectance than that of the lower light blocking film on the upper surface of the first functional layer, and simultaneously patterning the second functional layer and the first functional layer to form the lower light blocking film and the light absorbing film.

In the method of manufacturing a panel according to the present invention, the light absorbing film is directly laminated on the upper surface of the lower light blocking film, and the lower light blocking film and the light absorbing film are formed in the same pattern. Thus, the method enables the production of a transmission liquid crystal panel in which the light absorbing film reliably prevents reflection of rays of light by the upper surface of the lower light blocking film, thereby making it possible to readily produce the transmission liquid crystal panel of the present invention.

According to one aspect of the present invention, a method of manufacturing a panel comprises the steps of, enclosing the data electrodes with an interlayer insulating film, forming a third functional layer with lower light transmittance and lower reflectance than those of the upper metal film on the upper surface of the interlayer insulating film, forming a fourth functional layer with high reflectance on the upper surface of the third functional layer, and simultaneously patterning the fourth functional layer and the third functional layer to form the light blocking film and the upper metal film.

In the method of manufacturing a panel according to the present invention, the light blocking film is directly laminated on the lower surface of the upper metal film, and the upper metal film and the light absorbing film are formed in the same pattern. Thus, the method enables the production of a transmission liquid crystal panel in which the light blocking film reliably prevents reflection of rays of light by the lower surface of the upper metal film, thereby making it possible to readily produce the transmission liquid crystal panel of the present invention.

In the present invention, in the laminating direction of the various types of the layers in the transmission liquid crystal panel, the circuit side is referred to as "lower side" and the liquid crystal side as "upper side". These directions, however, are used for the sake of convenience to simplify the description, and impose no limitation on directions during actual manufacture or use of the apparatus.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
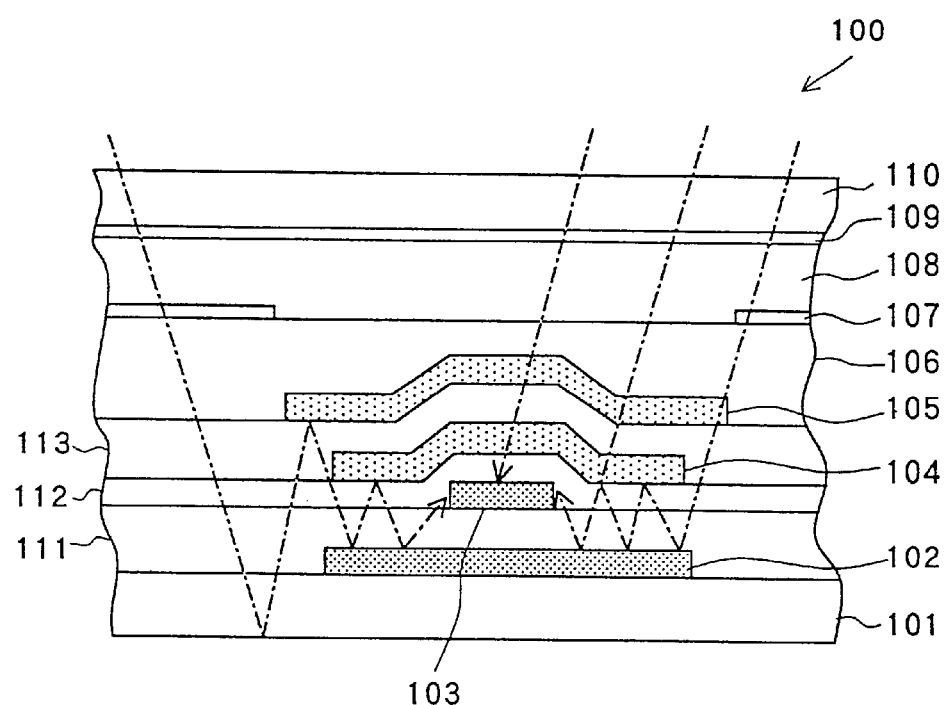
FIG. 1 is a vertical sectional front view showing main components of a liquid crystal light valve which is a transmission liquid crystal panel of a prior art.
Figure 2:
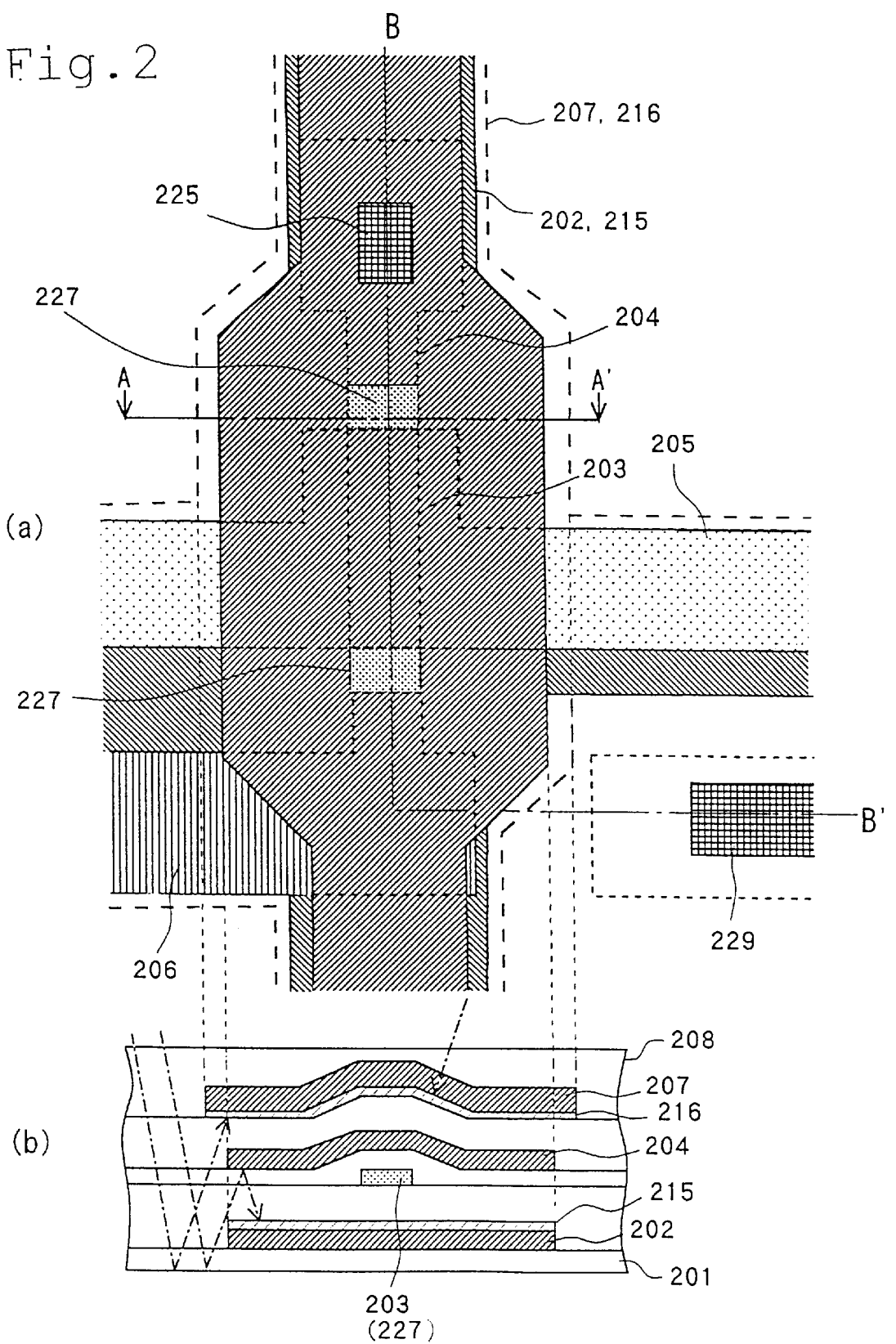
FIG. 2 shows a plan view and a sectional view illustrating a laminated structure of a circuit portion of a liquid crystal light valve which is an embodiment of a transmission liquid crystal panel of the present invention.

Referring now to FIG. 2, there is shown a liquid crystal light valve 200 which is an embodiment of a transmission liquid crystal panel according to the present invention.

Liquid crystal light valve 200 comprises, as main components, transparent substrate 201, lower light blocking film 202, numerous TFTs (Thin film transistors) 203, a plurality of data electrodes 204, a plurality of gate electrodes 205, a plurality of drain electrodes 206, upper metal film 207, planarizied layer 208, numerous separate electrodes 209, encapsulated liquid crystal 210, common electrode 211, and opposite substrate 212, similar to liquid crystal light valve 100 described above as a prior art.

Unlike the liquid crystal light valve 100 of the prior art, liquid crystal light valve 200 according to the embodiment, however, includes light absorbing film 215 laminated on the upper surface of lower light blocking film 202 and light blocking film 216 laminated on the lower surface of upper metal film 207.

Figure 9:
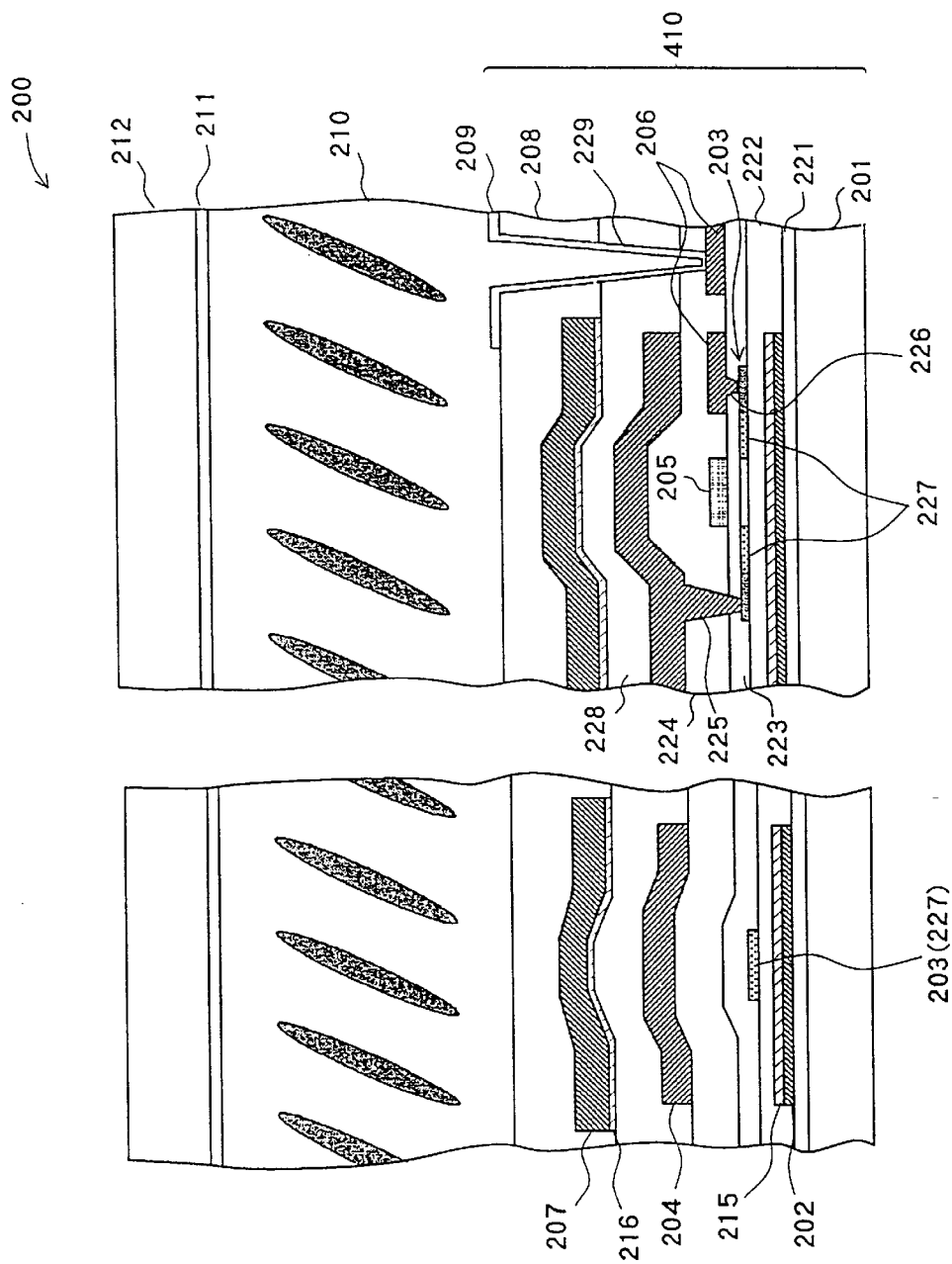
FIG. 9 is a sectional view showing the last step of a panel manufacturing method.

More specifically, as shown in FIG. 9, transparent substrate 201 is made of an insulating glass substrate, and groundwork insulating film 221 is uniformly laminated on the upper surface thereof. Lower light blocking film 202 are made of WSi with high heat resistance and low light transmittance, and laminated on the upper surface of groundwork insulating film 221.

Lower light blocking film 202 are formed with a thickness of 150 nm and patterned so as to individually shield TFTs 203 from stray light which is directed toward an upward and slant direction. Light absorbing film 215 is made of a-Si with low reflectance and high heat resistance, and directly laminated on the upper surface of lower light blocking film 202. Light absorbing film 215 is formed with a thickness of 50 nm, and formed in the same pattern as lower light blocking film 202.

Figure 3:
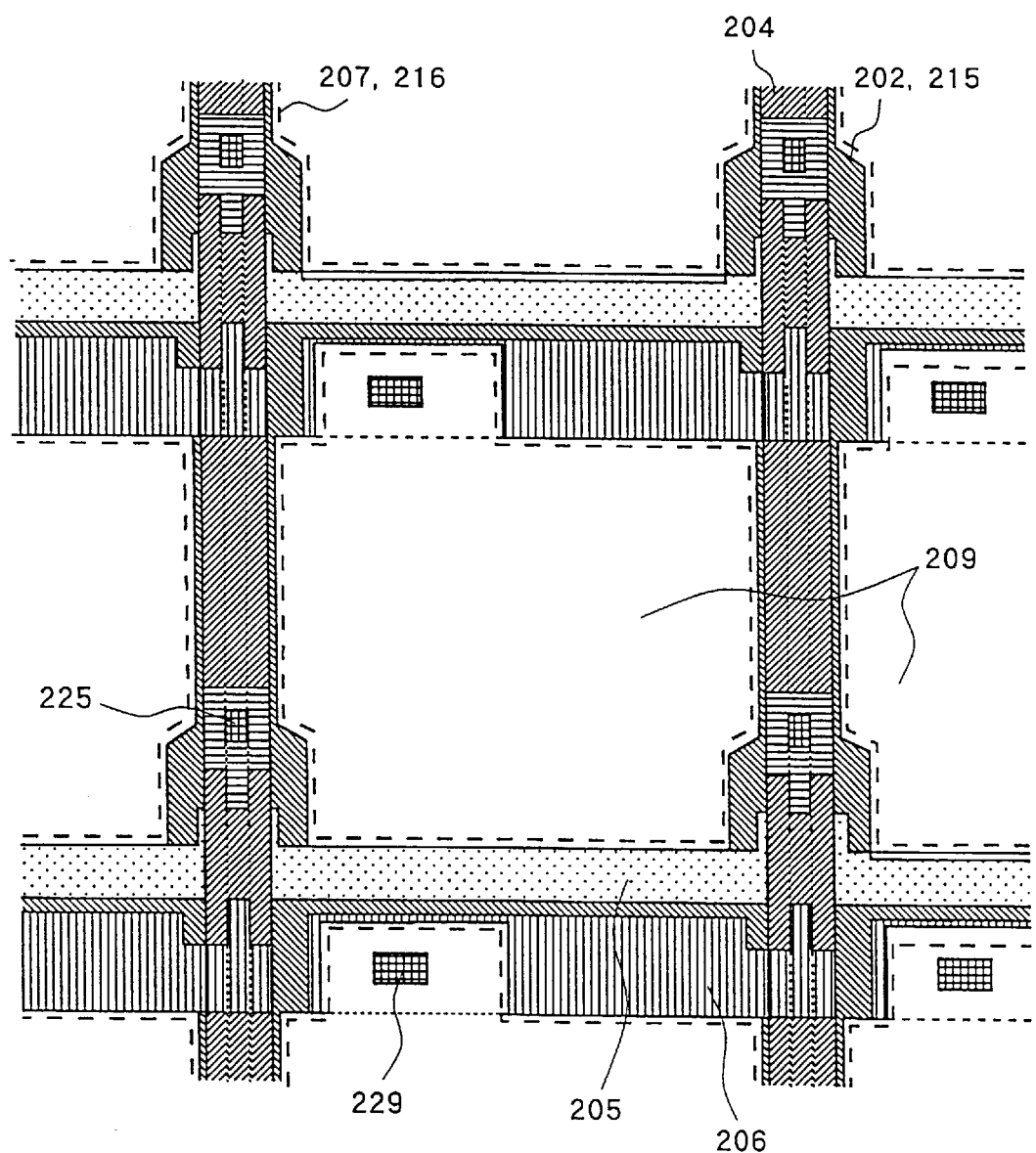
FIG. 3 is a plan view showing a pixel portion of the liquid crystal light valve.

TFT 203 is located above light absorbing film 215 interlayer insulating film 222, and connected to electrodes 204 to 206. Specifically, as shown in FIG. 3, a plurality of data electrodes 204 and a plurality of gate electrodes 205 form a matrix electrode, at the intersections of which numerous TFTs 203 are individually arranged.

More specifically, gate electrode 205 is made of a metal layer with a pattern which extends in the lateral direction in the drawing, and face the central upper surface of TFT 203 through gate insulating film 223. Data electrode 204 is made of an aluminum layer with a pattern which extends the longitudinal direction in the drawing, and is laminated above TFT 203 through interlayer insulating film 224.

Drain electrode 206 is formed on the upper surface of gate insulating film 223. Data electrode 204 and drain electrode 206 are connected to a source region and a drain region at both ends of TFT 203 through contact holes 225 and 226, respectively. LDD regions 227 are formed between each end and the central portion of TFT 203.

Light blocking film 216 is located above data electrode 204 through interlayer insulating film 228, and upper metal film 207 is directly laminated on the upper surface of light blocking film 216. Light blocking film 216 is made of conductive Ti with lower light transmittance and lower reflectance than those of upper metal film 207, and formed with a thickness of 50 nm. Upper metal film 207 is made of aluminum with high reflectance at a thickness of 500 nm. In this case, light blocking film 216 and upper metal film 207 are formed in the same pattern to shield data electrode 204.

Planarizied layer 208 is made of insulating organic resin such as polyimide and laminated on upper metal film 207 with its upper surface being formed flat. Each separate electrodes 209 comprises ITO layer each formed for a display pixel on the upper surface of planarizied layer 208, and is connected to TFT 203 through contact hole 229.

Opposite substrate 212 is also made of a colorless and transparent insulating glass substrate, and is laminated above planarizied layer 208 with a predetermined gap there between through a spacer member (not shown). Common electrode 211 is also made of an ITO layer and is formed uniformly on the lower surface of opposite substrate 212. Encapsulated liquid crystal 210 is enclosed in the gap between planarizied layer 208 and opposite substrate 212, and an electric field is applied thereto with separate electrode 209 and common electrode 211.

A peripheral circuit (not shown) is formed on the periphery of liquid crystal light valve 200 and is connected to data electrodes 204, gate electrodes 205 and TFTs 203 in a matrix. In addition, lower light blocking film 202 is grounded, and upper metal film 207 and light blocking film 216 are also used as the wiring of the peripheral circuit.

Figure 4:
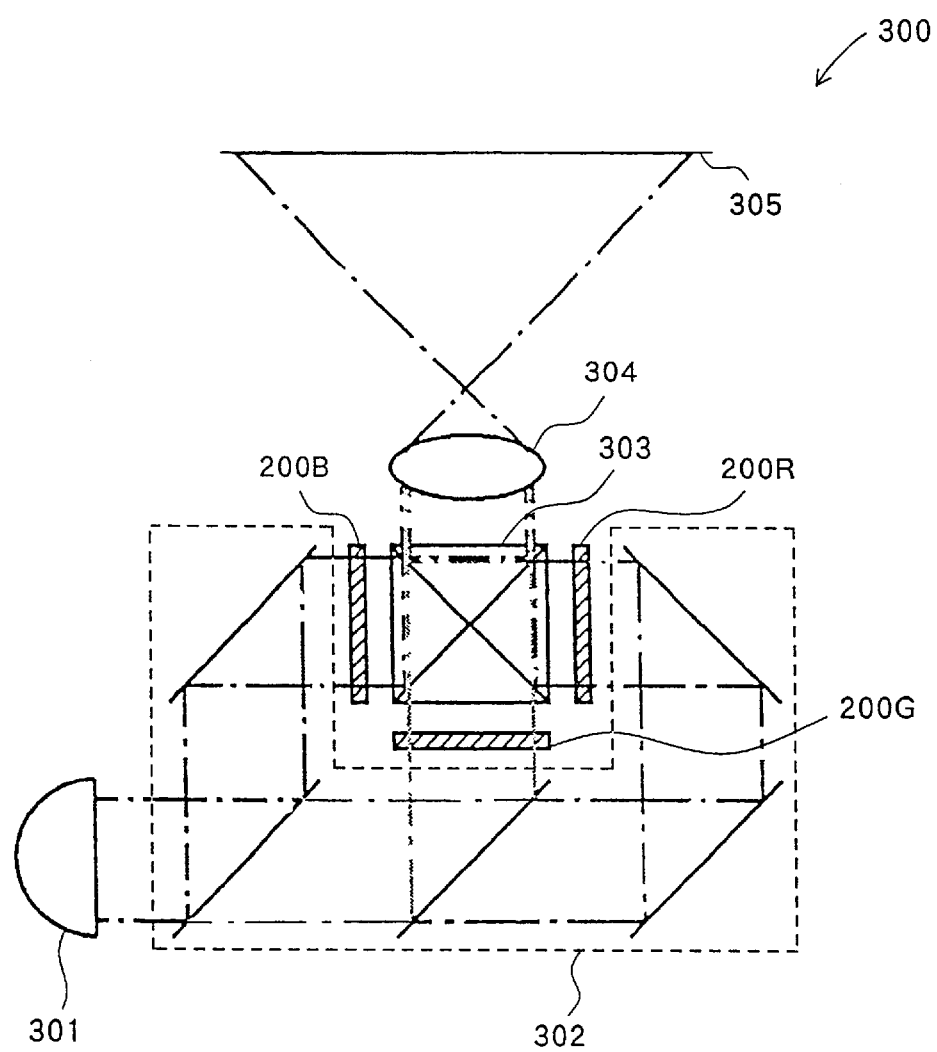
FIG. 4 is a schematic diagram showing the entire structure of an image display.

Liquid crystal light valve 200 according to the embodiment is utilized as liquid crystal projector system 300, which is an image display. Liquid crystal projector system 300 includes light source 301, as shown in FIG. 4, on which collimated optical system (not shown) is mounted.

Light source 301 emits rays of light as a parallel light pencil since a collimated optical system is mounted thereon. Disposed sequentially on an optical path from light source 301 through the collimated optical system, are separating optics 302 each made up of a half mirror or a reflecting mirror to divide the optical path into three.

Figure 5:
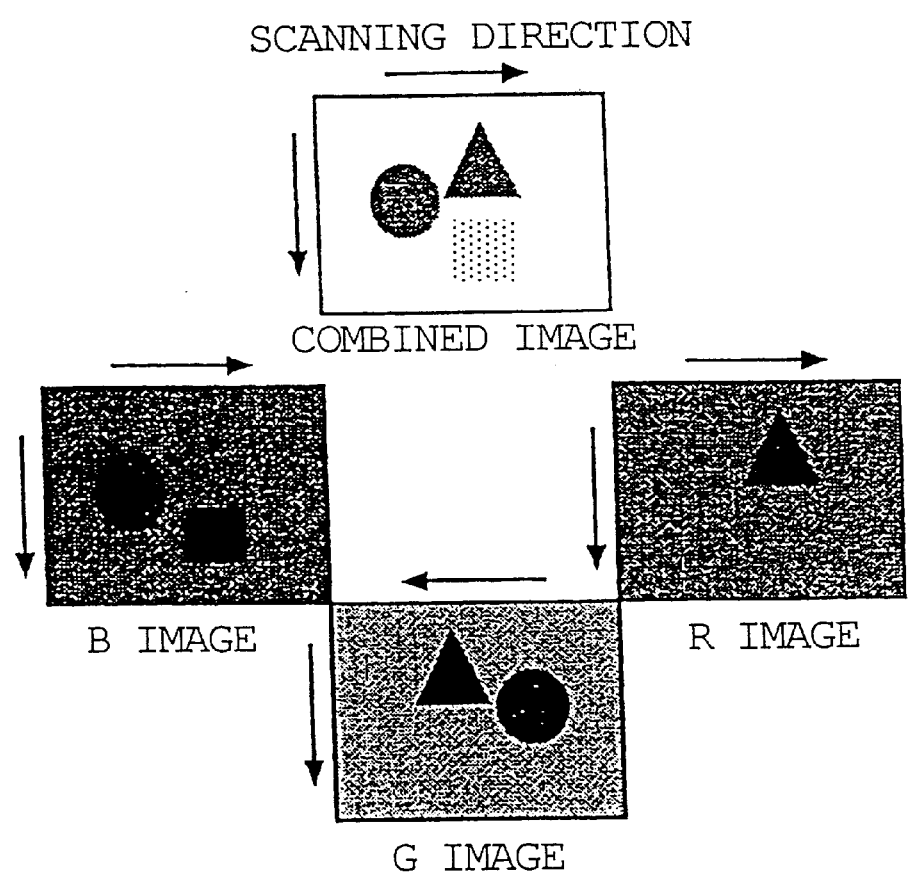
FIG. 5 is a schematic diagram showing a relationship between images produced by three liquid crystal light valves and one displayed image.

On the three optical paths divided by separating optics 302, three liquid crystal light valves, 200R, 200G and 200B are laminated respectively, each of which is provided with a transmission filter: (not shown) for R, G, B (Red, Green, Blue) respectively. Since these three transmission filters pass only the component each of corresponding to R, G, B in the rays of light respectively, three liquid crystal light valves 200R, 200G and 200B produce only image component corresponding to R, G, B respectively in a full color image as shown in FIG. 5.

Disposed three optical paths after transmission of three liquid crystal light valves 200R, 200G and 200B, is combined optical system 303 made up of one prism, which combines the three optical paths into one.

Reflective screen 305 is disposed on the one optical path from combined optical system 303 through imaging optic 304, which expands the one parallel light pencil emitted from combined optical system 303 onto screen 305 for imaging.

In the above configuration, liquid crystal light valve 200 according to the embodiment can produce an image from light transmittance in the active matrix mode and regulate the rays of light transmitted from upward to downward in accordance with the image since the presence or absence of the light transmittance in encapsulated liquid crystal 210 is controlled by TFT 203, similarly to liquid crystal light valve 100 of one prior art.

For this reason, liquid crystal projector system 300 according to the embodiment, three liquid crystal light valves 200R, 200G and 200B produce images for R, G, B component as shown in FIG. 5, can display because a full color image on screen 305.

When rays of light are transmitted through liquid crystal light valve 200 according to the embodiment downwardly from above, the rays of light incident on LDD region 227 causes deterioration of the operational characteristics of TFT 203. Since upper metal film 207 laminated above TFT 203 is made of aluminum, some of the rays of light are also transmitted through upper metal film 207.

In liquid crystal light valve 200 according to the embodiment, however, light blocking film 216 with lower light transmittance than that of upper metal film 207 is located on the lower surface of upper metal film 207. Thus, as shown in FIG. 2, light blocking film 216 blocks the rays of light transmitted through upper metal film 207 and directed toward TFT 203, and the rays of light transmitted through upper metal film 207 do not enter LDD region 227 of TFT 203.

When the rays of light are transmitted through liquid crystal light valve 200 downwardly from above, the rays of light may be reflected inside by the lower surface of transparent substrate 201 and directed toward the lower surfaces of upper metal film 207 and data electrode 204.

In liquid crystal light valve 200 according to the embodiment, however, since light blocking film 216 is located on the lower surface of upper metal film 207 and has lower reflectance than that of upper metal film 207 as described herein above, the rays of light incident on the lower surface of light blocking film 216 will be attenuated.

On the other hand, the rays of light incident on the lower surface of data electrode 204 is effectively reflected and directed toward the upper surface of lower light blocking film 202, on which light absorbing film 215 is located because of lower reflectance of light absorbing film 215 than that of lower light blocking film 202. The rays of light incident on the upper surface of light absorbing film 215 will be attenuated.

According to the rays of light reflected inside by the lower surface of transparent substrate 201 will be attenuated by light blocking film 216 and light absorbing film 215 during the multiple reflections in various portions, with the result that stray light of high intensity does not enter LDD region 227 of TFT 203.

Liquid crystal light valve 200 according to the embodiment can effectively prevent the incidence of the rays of light on LDD region 227 of TFT 203 as described herein above to allow stable operations of TFT 203. Therefore, liquid crystal projector system 300 according to the embodiment can display color images with good quality.

In particular, in liquid crystal light valve 200 according to the embodiment, the direct lamination of light absorbing film 215 on the upper surface of lower light blocking film 202 in the same pattern, makes it possible for light absorbing film 215 to reliably prevent reflection of rays of light by the upper surface of lower light blocking film 202, and the simultaneous patterning of light absorbing film 215 and lower light blocking film 202 is made possible during the manufacturing process.

In addition, the direct lamination of light blocking film 216 on the lower surface of upper metal film 207 in the same pattern makes it possible to reliably prevent reflection of rays of light by the lower surface of upper metal layer 207, and the simultaneous patterning of upper metal film 207 and light blocking film 216 is made possible during the manufacturing process.

Upper metal film 207 is utilized as shield a data electrode 204 as well as the wiring of the peripheral circuit, and light blocking film 216 directly laminated on upper metal film 207 also has conductivity. Thus, upper metal film 207 and light blocking film 216 can effectively shield data electrode 204 and serve as the wiring with low resistance for the peripheral circuit.

Figure 6A:
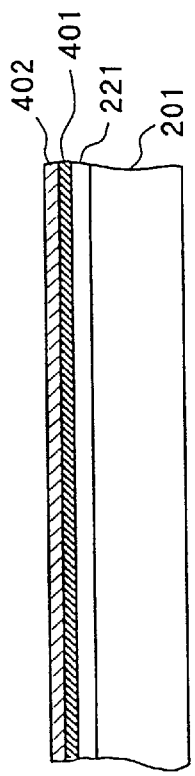
FIG. 6 is a sectional view showing a first step of a panel manufacturing method.

A method of manufacturing liquid crystal light valve 200 according to the embodiment will be explained below. First, transparent substrate 201 is prepared, and as shown in FIG. 6a, groundwork insulating film 221 of $SiO_2$ is formed with a thickness of 500 nm with an LPCVD (Low Pressure Chemical Vapor Deposition) method on the upper surface of transparent substrate 201. Groundwork insulating film 221 functions to prevent impurities from entering various types of layers from transparent substrate 201, and has a thickness suitable for the function.

On the upper surface of groundwork insulating film 221, WSi layer 401 of a thickness of 150 nm is formed as a first functional layer of high heat resistance and low light transmittance with a sputtering method. On the upper surface of WSi layer 401, a-Si layer 402 of a thickness of 50 nm is formed as a second functional layer of low reflectance with a plasma CVD method.

Figure 6B:
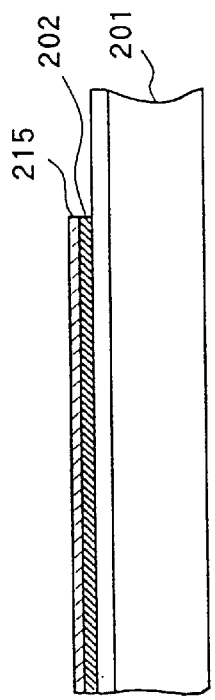

After a mask with a predetermined pattern is formed with a photoresist on the upper surface of a-Si layer 402, dry etching is performed. As shown in FIG. 6b, a-Si layer 402 and WSi layer 401 are simultaneously patterned to form lower light blocking film 202 and light absorbing film 215 in the same pattern. Lower light blocking film 202 may be formed with a thickness capable of blocking TFT 203 from light with a material to withstand the annealing temperature for TFT 203, described herein after.

When forming upper light blocking film 202 with WSi as described herein above, required minimum light transmittance can be realized with a thickness of 100 nm or higher, preferably 160 nm or higher, and 500 nm or lower is sufficient. Lower light blocking film 202 and light absorbing film 215 are patterned in a shape to cover a range extending approximately 2.5 $\mu$m from the center of LLD region 227 of TFT 203 in the direction of the channel length in order to effectively block LLD region 227 from light.

Figure 6C:
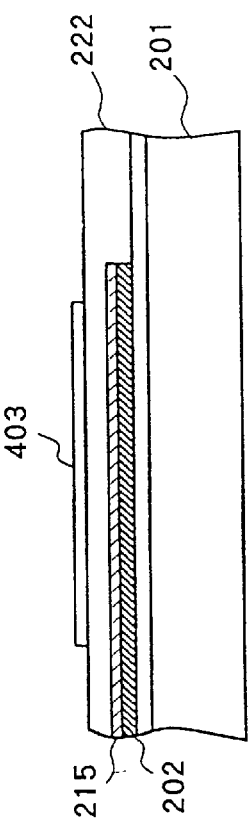

Next, as shown in FIG. 6c, interlayer insulating film 222 of $SiO_2$ is formed with a thickness of 1000 nm with an atmospheric pressure CVD method using TEOS as a material. The thickness of interlayer insulating film 222 is preferably 500 nm or higher and 2000 nm or lower is sufficient in order to prevent conductive lower light blocking film 202 from serving as a back gate of TFT 203.

Next, an a-Si layer (not shown) containing a slight amount of boron is formed with a thickness of 75 nm on the upper surface of interlayer insulating film 222 with an LPCVD method and is crystallized by the irradiation of an excimer laser with an intensity of 400 mJ at an ordinary temperature to form a polysilicon layer (not shown). The a-Si layer containing boron is formed by performing vapor phase doping of boron simultaneously with the formation of the a-Si film with a dose amount of approximately 1E–17 to 5E–17/$cm^3$.

In addition, a first layer (not shown) of gate insulating film 223 of $SiO_2$ is formed with a thickness of 10 nm on the upper surface of the polysilicon layer with the LPCVD method. The first layer and the polysilicon layer are patterned in island shape with photolithography and etching to form active layer 403 of TFT 203.

Next, a mask with a predetermined pattern is formed with a photoresist on the upper surface of the first layer of gate insulating film 223. Phosphorus P is introduced thereto at an acceleration voltage of 30 keV to a dose amount of 3E+15 atoms/$cm^3$ to form source/drain regions in active layer 403 of TFT 203.

Figure 7A:
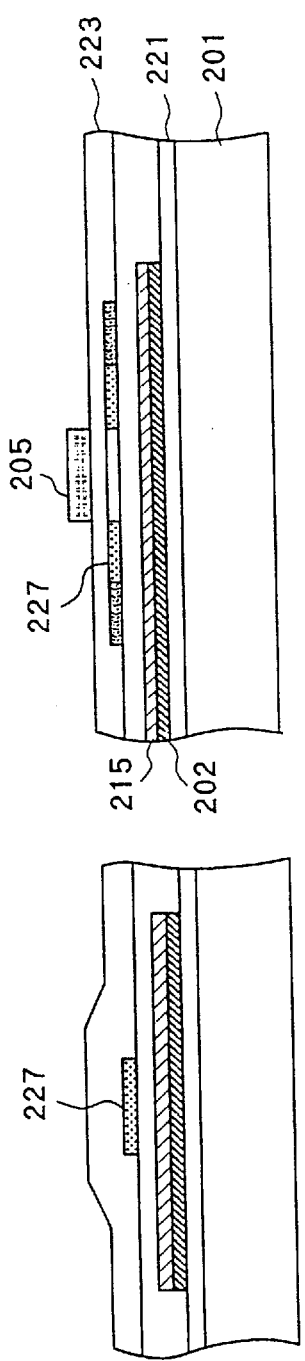
FIG. 7 is a sectional view showing a second step of a panel manufacturing method.

A second layer (not shown) of $SiO_2$ is formed with a thickness of 90 nm with the atmospheric pressure CVD method using TEOS as a material. As shown in FIG. 7a, gate insulating film 223 is formed by the second layer and the aforementioned first layer. On the upper surface thereof, $n^+$single crystal silicon (uc–$n^+$Si) is formed with a thickness of 70 nm, and then WSi is formed with a thickness of 100 nm with the sputtering method, and these are patterned in the same shape to form gate electrode 205. Gate electrode 205 is used as a mask to perform ion implantation for forming LDD region 227 in active layer 403 of TFT 203.

Figure 7B:
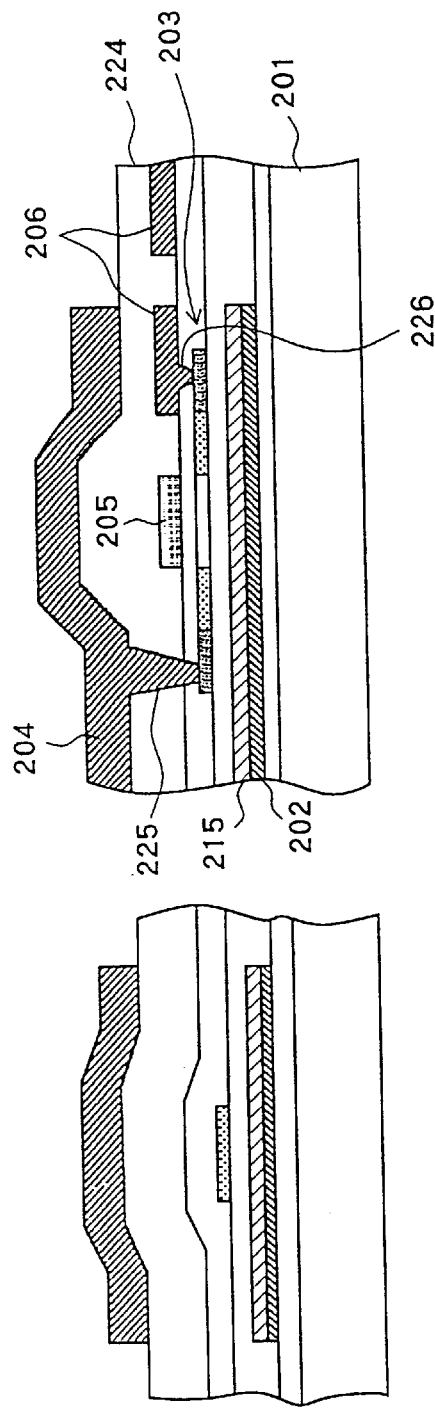

Next, as shown in FIG. 7b, contact hole 226 reaching one end of active layer 403 is formed on gate insulating film 223 with a photolithography technique. Thereafter, a metal layer (not shown) is formed from titanium or aluminum and patterned with dry etching to form drain electrode 206.

Similarly, contact hole 225 reaching the other end of active layer 403 is formed with the photolithography technique after interlayer insulating film 224 is formed, and a metal layer (not shown) is formed with a thickness of 500 nm from titanium or aluminum with the sputtering method. The metal layer is patterned with dry etching to form data electrode 204, thereby completing TFT 203.

Figure 8A:
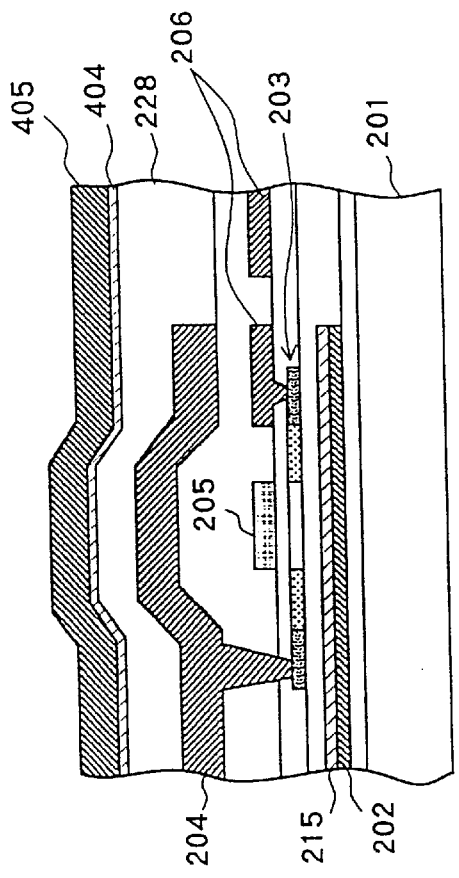
FIG. 8 is a sectional view showing a third step of a panel manufacturing method.

Thereafter, as shown in FIG. 8a, interlayer insulating film 228 is formed on data electrode 204. On the upper surface of interlayer insulating film 228, titanium layer 404 at a thickness of 50 nm is formed as a third functional layer of low light transmittance and low reflectance with the sputtering technique.

Figure 8B:
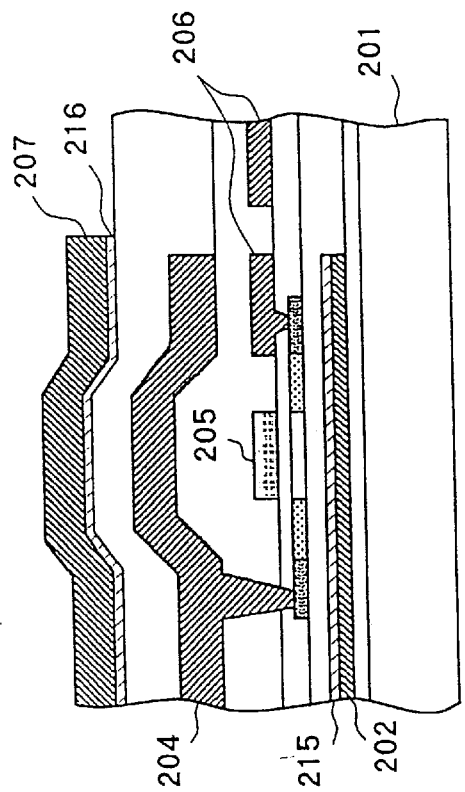

In addition, aluminum layer 405 at a thickness of 300 nm is formed on the upper surface of titanium layer 404 as a fourth functional layer of high reflectance with the sputtering method. As shown in FIG. 8b, these metal layers 404 and 405 are simultaneously patterned with the photolithography technique to form light blocking film 216 and upper metal film 207 in the same pattern.

Next, planarizied layer 208 is formed with a thickness of 1.0 $\mu$m with an organic resin such as polyimide, and then contact hole 229 reaching drain electrode 206 is formed with dry etching. An ITO layer (not shown) is formed and patterned corresponding to the shape of a display pixel to form separate electrode 209.

In the subsequent processes, similar to the prior art, circuit panel 410 is completed by performing the formation of passivation or the like, and a spacer (not shown) and opposite substrate 212 are sequentially bound thereto. In encapsulated liquid crystal 210 is then filled into the gap between the lower surface of opposite substrate 212 and the upper surface of circuit panel 410 to complete liquid crystal light valve 200.

With the aforementioned method, lower light blocking film 202 and light absorbing film 215 can be simultaneously patterned in the same shape, and upper metal film 207 and light blocking film 216 can be simultaneously patterned in the same shape, making liquid crystal light valve 200 according to the embodiment simple to manufacture.

The present inventor built prototypes of a liquid crystal light valve with a conventional structure and a liquid crystal light valve (not shown) having an additional light blocking film as a lower layer of an upper metal film in the aforementioned dimensions irradiated rays of light on both liquid crystal light valve, and measured leaks currents caused by the irradiated rays of light.

Figure 10:
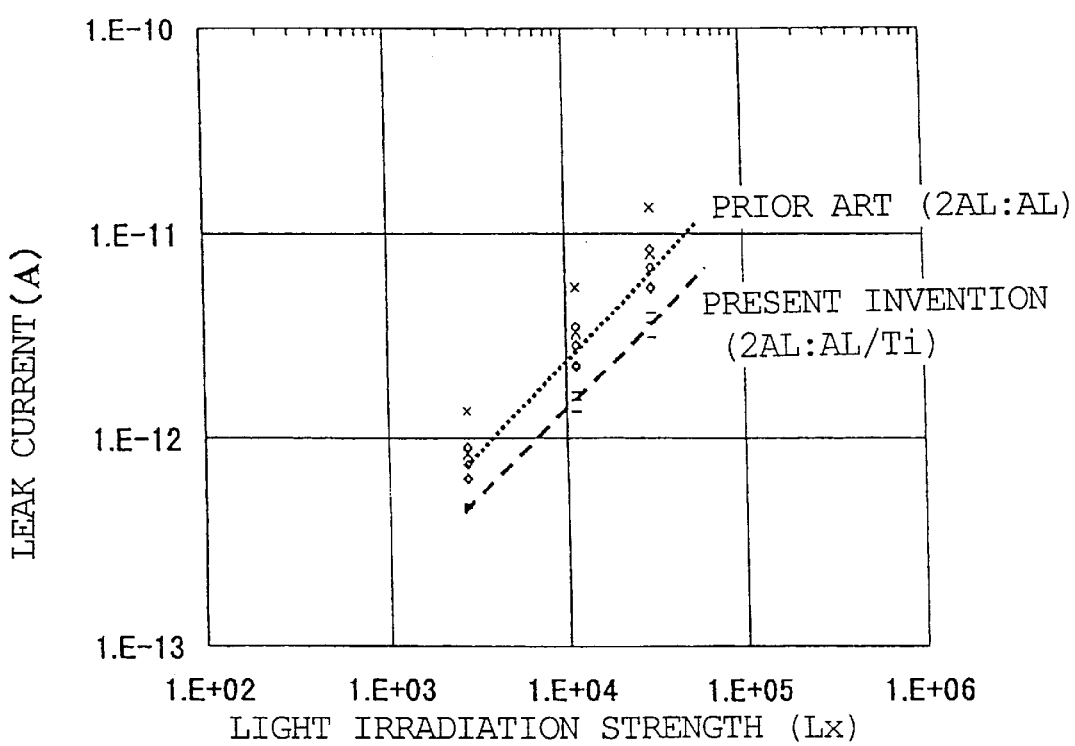
FIG. 10 is a characteristic diagram showing a relationship between light irradiation strength and leak current of the prior art and the present invention.

A blue rays of light which serves as a main factor of the leak currents was used and irradiated constitutes from upward to downward in consideration of actual use conditions. Then, as shown in FIG. 10, it was confirmed that the leak currents are reliably reduced in the structure having the additional light blocking film as compared with the conventional structure.

While the aforementioned embodiment has illustrated light absorbing film 215 made of a-Si, any material which can realize required high heat resistance and low reflectance, silicon or titanium nitride, may be employed as light absorbing film 215.

Furthermore, the thickness of light absorbing film 215 is not limited to the aforementioned 50 nm, and can be optimally determined in consideration of various conditions in practice. The thickness of light absorbing film 215 is preferably thick for effectively absorbing an incident ray of light, but too thick a layer will cause problems in the smoothness of the surface, and have 100 nm or lower is preferable in terms of practicality.

Similarly, while the aforementioned embodiment has illustrated light blocking film 216 formed of titanium, any material which can realize required low light transmittance and low reflectance may be used as light blocking film 216, such as molybdenum or tungsten. Its thickness is preferably thick for effectively shielding an incident rays of light, but too thick a layer will cause problems in the smoothness of the surface, and approximately 50 to 100 nm is preferable in terms of practicality.

Furthermore, while the aforementioned embodiment illustrated light absorbing film 215 directly laminated on the upper surface of lower light blocking film 202, light absorbing film 215 may be located at any position on lower light blocking film 202 and below TFT 203.

Similarly, the aforementioned embodiment has illustrated light blocking film 216 directly laminated on the lower surface of upper metal film 207, light blocking film 216 may be located at any position below upper metal film 207 and above TFT 203.

While the aforementioned embodiment has illustrated LDD region 227 formed in TFT 203, LLD region 227 may not be formed in TFT 203. However, since liquid crystal light valve 200 according to the embodiment can effectively prevent irradiation of rays of light on LDD region 227 of TFT 203, a structure having LDD region 227 formed in TFT 203 is most suitable.

Furthermore, while the aforementioned embodiment has illustrated, as an image display, liquid crystal projector system 300 for displaying full color images with three liquid crystal light valves 200, an image display (not shown) for displaying monochrome images with one liquid crystal light valve 200 can be implemented.

While preferred embodiments of the present invention have been described using specific terms, such description is for illustrative purposes only, and it is to be understood that changes and variations may be made without departing from the spirit or scope of the following claims.

What is claimed is:

1. A transmission liquid crystal panel comprising:

an insulating transparent substrate through which rays of light are transmitted downwardly from above;

a multiplicity of lower light blocking films with high heat resistance and low light transmittance two-dimensionally located above said transparent substrate;

a multiplicity of thin film transistors two-dimensionally located above said lower light blocking films;

a multiplicity of data electrodes each connected to said thin film transistor;

a multiplicity of gate electrodes each connected to said thin film transistor;

a multiplicity of drain electrodes each formed above said thin film transistor and connected to said thin film transistor;

an upper metal film with high reflectance located above said thin film transistors for shielding said data electrode;

a planarized layer with a flat upper surface located above said upper metal film;

a multiplicity of separate electrodes each two-dimensionally located above said planarized layer and each connected to said drain electrode of said thin film transistor;

encapsulated liquid crystal located above said separate electrodes and driven by said thin film transistors through said separate electrodes;

a common electrode opposite to said separate electrodes through said encapsulated liquid crystal;

a transparent opposite substrate for encapsulating said encapsulated liquid crystal, said common electrode being formed on a lower surface of said transparent opposite substrate; and at least one of light blocking film with lower light transmittance and lower reflectance than those of said upper metal film located above said thin film transistors and below said upper metal film.

2. A transmission liquid crystal panel comprising:

an insulating transparent substrate through which rays of light are transmitted downwardly from above;

a multiplicity of lower light blocking films with high heat resistance and low light transmittance two-dimensionally located above said transparent substrate;

a multiplicity of thin film transistors two-dimensionally located above said lower light blocking films;

a multiplicity of data electrodes each connected to said thin film transistor;

a multiplicity of gate electrodes each connected to said thin film transistor;

a multiplicity of drain electrodes each formed above said thin film transistor and connected to said thin film transistor;

an upper metal film with high reflectance located above said thin film transistors for shielding said data electrode;

a planarized layer with a flat upper surface located above said upper metal film;

a multiplicity of separate electrodes each two-dimensionally located above said planarized layer and each connected to said drain electrode of said thin film transistor;

encapsulated liquid crystal located above said separate electrodes and driven by said thin film transistors through said separate electrodes;

a common electrode opposite to said separate electrodes through said encapsulated liquid crystal;

a transparent opposite substrate for encapsulating said encapsulated liquid crystal, said common electrode being formed on a lower surface of said transparent opposite substrate;

at least one of light blocking film with lower reflectance than that of said upper metal film located above said thin film transistors and below said upper metal film; and at least one of light absorbing film with lower reflectance and higher heat resistance than those of said lower light blocking films located below said thin film transistors and above said lower light blocking films.

3. A transmission liquid crystal panel comprising:

an insulating transparent substrate through which rays of light are transmitted downwardly from above;

a multiplicity of lower light blocking films with high heat resistance and low light transmittance two-dimensionally located above said transparent substrate;

a multiplicity of thin film transistors two-dimensionally located above said lower light blocking films;

a multiplicity of data electrodes each connected to said thin film transistor;

a multiplicity of gate electrodes each connected to said thin film transistor;

a multiplicity of drain electrodes each formed above said thin film transistor and connected to said thin film transistor;

an upper metal film with high reflectance located above said thin film transistors for shielding said data electrode;

a planarized layer with a flat upper surface located above said upper metal film;

a multiplicity of separate electrodes each two-dimensionally located above said planarized layer and each connected to said drain electrode of said thin film transistor;

encapsulated liquid crystal located above said separate electrodes and driven by said thin film transistors through said separate electrodes;

a common electrode opposite to said separate electrodes through said encapsulated liquid crystal;

a transparent opposite substrate for encapsulating said encapsulated liquid crystal, said common electrode being formed on a lower surface of said transparent opposite substrate;

at least one of light blocking film with lower light transmittance and lower reflectance than those of said upper metal film located above said thin film transistors and below said upper metal film; and at least one of light absorbing film with lower reflectance and higher heat resistance than those of said lower light blocking films located below said thin film transistors and above said lower light blocking films.

4. The transmission liquid crystal panel according to claim 2, wherein said light absorbing film with the same pattern as said lower light blocking films is laminated on an upper surface of said lower light blocking films.

5. The transmission liquid crystal panel according to claim 3, wherein said light absorbing film with the same pattern as said lower light blocking films is laminated on an upper surface of said lower light blocking films.

6. The transmission liquid crystal panel according to claim 1, wherein said light blocking film with the same pattern as said upper metal film is laminated on a lower surface of said upper metal film.

7. The transmission liquid crystal panel according to claim 2, wherein said light blocking film with the same pattern as said upper metal film is laminated on a lower surface of said upper metal film.

8. The transmission liquid crystal panel according to claim 3, wherein said light blocking film with the same pattern as said upper metal film is laminated on a lower surface of said upper metal film.

9. A transmission liquid crystal panel comprising:

an insulating transparent substrate through which rays of light are transmitted downwardly from above;

a multiplicity of lower light blocking films with high heat resistance and low light transmittance two-dimensionally located above said transparent substrate;

a multiplicity of thin film transistors two-dimensionally located above said lower light blocking films;

a multiplicity of data electrodes each connected to said thin film transistor;

a multiplicity of gate electrodes each connected to said thin film transistor;

a multiplicity of drain electrodes each connected to said thin film transistor;

an upper metal film with high reflectance located above said thin film transistors for shielding said data electrode;

a planarized layer with a flat upper surface located above said upper metal film;

a multiplicity of separate electrodes each two-dimensionally located above said planarized layer and each connected to said drain electrode of said thin film transistor;

encapsulated liquid crystal located above said separate electrodes and driven by said thin film transistors through said separate electrodes;

a common electrode opposite to said separate electrodes through said encapsulated liquid crystal;

a transparent opposite substrate for encapsulating said encapsulated liquid crystal, said common electrode being formed on a lower surface of said transparent opposite substrate; and at least one of light blocking film with lower light transmittance and lower reflectance than those of said upper metal film located above said thin film transistors and below said upper metal film, wherein said light blocking film with the same pattern as said upper metal film is laminated on a lower surface of said upper metal film, and wherein said light blocking film is conductive.

10. A transmission liquid crystal panel comprising:

an insulating transparent substrate through which rays of light are transmitted downwardly from above;

a multiplicity of lower light blocking films with high heat resistance and low light transmittance two-dimensionally located above said transparent substrate;

a multiplicity of thin film transistors two-dimensionally located above said lower light blocking films;

a multiplicity of data electrodes each connected to said thin film transistor;

a multiplicity of gate electrodes each connected to said thin film transistor;

a multiplicity of drain electrodes each connected to said thin film transistor;

an upper metal film with high reflectance located above said thin film transistors for shielding said data electrode;

a planarized layer with a flat upper surface located above said upper metal film;

a multiplicity of separate electrodes each two-dimensionally located above said planarized layer and each connected to said drain electrode of said thin film transistor;

encapsulated liquid crystal located above said separate electrodes and driven by said thin film transistors through said separate electrodes;

a common electrode opposite to said separate electrodes through said encapsulated liquid crystal;

a transparent opposite substrate for encapsulating said encapsulated liquid crystal, said common electrode being formed on a lower surface of said transparent opposite substrate;

at least one of light blocking film with lower reflectance than that of said upper metal film located above said thin film transistors and below said upper metal film; and at least one of light absorbing film with lower reflectance and higher heat resistance than those of said lower light blocking films located below said thin film transistors and above said lower light blocking films, wherein said light blocking film with the same pattern as said upper metal film is laminated on a lower surface of said upper metal film, and wherein said light blocking film is conductive.

11. A transmission liquid crystal panel comprising:

an insulating transparent substrate through which rays of light are transmitted downwardly from above;

a multiplicity of lower light blocking films with high heat resistance and low light transmittance two-dimensionally located above said transparent substrate;

a multiplicity of thin film transistors two-dimensionally located above said lower light blocking films;

a multiplicity of data electrodes each connected to said thin film transistor;

a multiplicity of gate electrodes each connected to said thin film transistor;

a multiplicity of drain electrodes each connected to said thin film transistor;

an upper metal film with high reflectance located above said thin film transistors for shielding said data electrode;

a planarized layer with a flat upper surface located above said upper metal film;

a multiplicity of separate electrodes each two-dimensionally located above said planarized layer and each connected to said drain electrode of said thin film transistor;

encapsulated liquid crystal located above said separate electrodes and driven by said thin film transistors through said separate electrodes;

a common electrode opposite to said separate electrodes through said encapsulated liquid crystal;

a transparent opposite substrate for encapsulating said encapsulated liquid crystal, said common electrode being formed on a lower surface of said transparent opposite substrate;

at least one of light blocking film with lower light transmittance and lower reflectance than those of said upper metal film located above said thin film transistors and below said upper metal film; and at least one of light absorbing film with lower reflectance and higher heat resistance than those of said lower light blocking films located below said thin film transistors and above said lower light blocking films, wherein said light blocking film with the same pattern as said upper metal film is laminated on a lower surface of said upper metal film, and wherein said light blocking film is conductive.

12. An image display comprising:

a light source for emitting rays of light;

at least one of the transmission liquid crystal panel according to claim 1 laminated at a position where said rays of light emitted from said light source is transmitted; and a screen on which said rays of light after transmission through said transmission liquid crystal panel is irradiated.

13. An image display comprising:

a light source for emitting rays of light;

the transmission liquid crystal panel according to claim 2 laminated at a position where said rays of light emitted from said light source is transmitted; and a screen on which said rays of light after transmission through said transmission liquid crystal panel is irradiated.

14. An image display comprising:

a light source for emitting rays of light;

the transmission liquid crystal panel according to claim 3 laminated at a position where said rays of light emitted from said light source is transmitted; and a screen on which said rays of light after transmission through said transmission liquid crystal panel is irradiated.

15. A method of manufacturing said light blocking film and said light absorbing film of the transmission liquid crystal panel according to claim 2, comprising the steps of:

forming a first functional layer with high heat resistance and low light transmittance on an upper surface of said transparent substrate;

forming a second functional layer with lower reflectance than that of said lower light blocking films on an upper surface of said first functional layer; and simultaneously patterning said second functional layer and said first functional layer to form said light blocking film and said light absorbing film.

16. A method of manufacturing said light blocking film and said light absorbing film of the transmission liquid crystal panel according to claim 3, comprising the steps of:

forming a first functional layer with high heat resistance and low light transmittance on an upper surface of said transparent substrate;

forming a second functional layer with lower reflectance than that of said lower light blocking films on an upper surface of said first functional layer; and simultaneously patterning said second functional layer and said first functional layer to form said light blocking film and said light absorbing film.

17. A method of manufacturing said upper metal film and said light blocking film of the transmission liquid crystal panel according to claim 1, comprising the steps of:

enclosing said data electrodes with an interlayer insulating film;

forming a third functional layer with lower light transmittance and lower reflectance than those of said upper metal film on an upper surface of said interlayer insulating film;

forming a fourth functional layer with high reflectance on an upper surface of said third functional layer; and simultaneously patterning said fourth functional layer and said third functional layer to form said upper metal film and said light blocking film.

18. A method of manufacturing said upper metal film and said light blocking film of the transmission liquid crystal panel according to claim 2, comprising the steps of:

enclosing said data electrodes with an interlayer insulating film;

forming a third functional layer with lower light transmittance and lower reflectance than those of said upper metal film on an upper surface of said interlayer insulating film;

forming a fourth functional layer with high reflectance on an upper surface of said third functional layer; and simultaneously patterning said fourth functional layer and said third functional layer to form said upper metal film and said light blocking film.

19. A method of manufacturing said upper metal film and said light blocking film of the transmission liquid crystal panel according to claim 3, comprising the steps of:

enclosing said data electrodes with an interlayer insulating film;

forming a third functional layer with lower light transmittance and lower reflectance than those of said upper metal film on an upper surface of said interlayer insulating film;

forming a fourth functional layer with high reflectance on an upper surface of said third functional layer; and simultaneously patterning said fourth functional layer and said third functional layer to form said upper metal film and said light blocking film.

* * * * *